US006488850B2

(12) United States Patent
Perriello (10) Patent No.: US 6,488,850 B2
(45) Date of Patent: *Dec. 3, 2002

(54) METHOD AND APPARATUS FOR ANAEROBICALLY DEGRADING POLLUTANTS WITH ALKANES

(75) Inventor: Felix Anthony Perriello, Norwood, MA (US)

(73) Assignee: Global BioSciences, Inc., North Attleborough, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/729,039

(22) Filed: Dec. 4, 2000

(65) Prior Publication Data

US 2001/0023847 A1 Sep. 27, 2001

Related U.S. Application Data

(63) Continuation-in-part of application No. 09/275,320, filed on Mar. 24, 1999, now Pat. No. 6,245,235, which is a continuation-in-part of application No. 08/767,750, filed on Dec. 17, 1996, now Pat. No. 5,888,396.
(60) Provisional application No. 60/234,482, filed on Sep. 22, 2000.

(51) Int. Cl.⁷ ............................... C02F 3/28; C02F 3/30
(52) U.S. Cl. ..................... 210/605; 210/611; 210/747; 210/170; 210/220; 210/908; 435/262; 435/262.5
(58) Field of Search ...................... 210/610, 611, 210/620, 747, 908, 909, 603, 605, 630, 170, 220; 435/262, 262.5

(56) References Cited

U.S. PATENT DOCUMENTS

| | | | |
|---|---|---|---|
| 3,846,290 A | * 11/1974 | Raymond | 210/610 |
| 4,713,343 A | 12/1987 | Wilson, Jr. et al. | |
| 5,006,250 A | * 4/1991 | Robert et al. | 210/610 |
| 5,037,551 A | 8/1991 | Barkley et al. | |
| 5,057,221 A | 10/1991 | Bryant et al. | |
| 5,277,815 A | * 1/1994 | Beeman | 210/610 |
| 5,302,286 A | * 4/1994 | Semprini et al. | 210/747 |
| 5,316,940 A | 5/1994 | Georgiou et al. | |
| 5,326,703 A | 7/1994 | Hazen et al. | |
| 5,342,769 A | 8/1994 | Hunter et al. | |
| 5,384,048 A | 1/1995 | Hazen et al. | |
| 5,441,887 A | 8/1995 | Hanson et al. | |
| 5,512,479 A | 4/1996 | Steffan | |
| 5,814,514 A | 9/1998 | Steffan et al. | |
| 5,888,396 A | 3/1999 | Perriello | |
| 6,051,130 A | 4/2000 | Perriello | |
| 6,110,372 A | 8/2000 | Perriello | |
| 6,156,203 A | 12/2000 | Perriello | |
| 6,245,235 B1 | 6/2001 | Perriello | |

FOREIGN PATENT DOCUMENTS

| | | |
|---|---|---|
| DE | 4142063 | 12/1991 |
| EP | 0098138 | 1/1984 |

OTHER PUBLICATIONS

Fogel et al., Biodegradation of Chlorinated Ethenes by Methane–Utilizing Mixed Culture, *Applied and Environmental Microbiology*, vol. 51, No. 4, pp. 720–724 (Apr. 1986).

(List continued on next page.)

Primary Examiner—Christopher Upton
(74) Attorney, Agent, or Firm—Alan G. Towner; Pietragallo, Bosick & Gordon (57) ABSTRACT

A method and apparatus are disclosed in which alkanes such as butane are used to degrade pollutants such as tetrachloroethylene (PCE) and carbon tetrachloride (CT) at contaminated sites. In a preferred embodiment, pollutant concentrations are reduced by injecting a butane substrate into a contaminated area to stimulate the growth of anaerobic butane-utilizing bacteria which degrade the pollutants. In addition to the anaerobic treatment, the area may optionally be treated aerobically by switching from anaerobic to aerobic conditions.

27 Claims, 5 Drawing Sheets-

OTHER PUBLICATIONS

Wackett et al., Survey of Microbial Oxygenases: Trichloroethylene Degradation by Propane–Oxidizing Bacteria, *Applied and Environmental Microbiology*, vol. 55, No. 11, pp. 2960–2964 (Nov. 1989).

Broholm et al., Toxicity of 1,1,1–Trichloroethane and Trichloroethene on a Mixed Culture of Methane–Oxidizing Bacteria, *Applied and Environmental Microbiology*, vol. 56, No. 8, pp. 2488–2493 (Aug. 1990).

Fox, Status and Trends in Bioremediation Treatment Technology, *Remediation*, pp. 293–303 (Summer 1991).

Alvarez–Cohen et al., Characterization of a Methane–Utilizing Bacterium from a Bacterial Consortium That Rapidly Degrades Trichloroethylene and Chloroform, *Applied and Environmental Microbiology*, Vo. 58, No. 6, pp. 1886–1893 (Jun. 1992).

Chang et al., Transformation Capacities of Chlorinated by Mixed Cultures Enriched on Methane, Propane, Toluene, or Phenol, *Biotechnology and Bioengineering*, vol. 45, pp. 440–449 (Nov. 9, 1994).

Kim et al., Aerobic Cometabolism of Chloroform and 1,1,1–Trichloroethane by Butane–Grown Microorganisms, *Bioremediation Journal*, vol. 1, No. 2, pp. 135–148 (1997).

Hamamura et al., Chloroform Cometabolism by Butane–Grown CF8, *Pseudomonas butanovora*, and *Mycobacterium vaccae* JOB5 and Methane–Grown *Methylosinus trichosporium* OB3b, *Applied and Environmental Microbiology*, vol. 63, No. 9, pp. 3607–3613 (Sep. 1997).

Steffan et al., Biodegradation of the Gasoline Oxygenates Methyl tert–Butyl Ether, Ethyl tert–Butyl Ether, and tert–Amyl Methyl Ether by Propane–Oxidizing Bacteria, *Applied and Environmental Microbiology*, vol. 63, No. 11, pp. 4216–4222, (Nov. 1997).

Wilson et al., "Biotransformation of Trichloroethylene in Soil," *Applied and Environmental Microbiology*, Jan., 1985; p. 242–243, vol. 49, No. 1.

Nelson et al., "Aerobic Metabolism of Trichloroethylene by a Bacterial Isolate," *Applied and Environmental Microbiology*, Aug. 1986, p. 383–384, vol. 52.

Little et al., "Trichloroethylene Biodegradation by a Methane–Oxidizing Bacterium," *Applied and Environmental Microbiology*, Apr. 1988, p. 951–956, vol. 54.

Arciero et al., "Degradation of Trichloroethylene by the Ammonia–Oxidizing Bacterium *Nitrosomonas Europaea*," *Biochemical and Biophysical Research Communications*, Mar. 15, 1989; p. 640–643, vol. 159, No. 2.

Oldenhuis et al., "Degradation of Chlorinated Aliphatic Hydrocarbons by *Methylosinus trichosporium* OB3b Expressing Soluble Methane Monooxygenase," *Applied and Environmental Microbiology*, Nov. 1989 p. 2819–2826, vol. 55, No. 11.

Tsien et al., "Biodegradation of Trichloroethylene by *Methylosinus trichosporium* OB3b," *Applied and Environmental Microbiology*, Dec. 1989; p. 3155–3161, vol. 55, No. 12.

Vannelli et al., "Degradation of Halogenated Aliphatic Compounds by the Ammonia–Oxidizing Bacterium *Nitrosomonas europaea*," *Applied and Environmental Microbiology*, Apr. 1990; p. 1169–1171, vol. 56, No. 4.

Folsom et al., "Phenol and Trichloroethylene Degradation by *Pseudomonas cepacia* G4: Kinetics and Interactions Between Substrates," *Applied and Environmental Microbiology*, May 1990; p. 1279–1285, vol. 56, No. 5.

Henry et al., "Influence of Endogenous and Exogenous Electron Donors and Trichloroethylene Oxidation Toxicity on Trichloroethylene Oxidation by Methanotrophic Cultures from a Groundwater Aquifer," *Applied and Environmental Microbiology*, Jan. 1991; p. 236–244, vol. 57, No. 1.

Oldenhuis et al., "Kinetics of Chlorinated Hydrocarbon Degradation by *Methylosinus trichosporium* OB3b and Toxicity of Trichloroethylene," *Applied and Environmental Microbiology*, Jan. 1991; p. 7–14, vol. 57, No. 1.

Alvarez–Cohen et al., "Product Toxicity and Cometabolic Competitive Inhibition Modeling of Chloroform and Trichloroethylene Transformation by Methanotrophic Resting Cells," *Applied Environmental Microbiology*, Apr. 1991; p. 1031–1037, vol. 57, No. 4.

Büyüksönmez et al., "Optimization of Simultaneous Chemical and Biological Mineralization of Perchoethylene," *Applied and Environmental Microbiology*, Jun. 1999; p. 2784–2788, vol. 65, No. 6.

Maymó–Gatell et al., "Reductive Dechlorination of Chlorinated Ethenes and 1, 2–Dichloroethane by '*Dehalococcoides ethenogenes*' 195," *Applied and Environmental Microbiology*, Jul. 1999; p. 3108–3113, vol. 65, No. 7.

Hamamura et al., "Diversity in Butane Monooxygenases Among Butane–Grown Bacteria," *Applied and Environmental Microbiology*, Oct. 1999; p. 4586–4593, vol. 65, No. 10.

Löffler et al., "16S rRNA Gene–Based Detection of Tetrachloroethene–Dechlorinating Desulfuromonas and Dehalococcoides Species," *Applied and Environmental Microbiology*, Apr. 2000; p. 1369–1374, vol. 66, No. 4.

Haggblom et al., "Influence of Alternative Electron Acceptors on the Anaerobic Biodegradability of Chlorinated Phenols and Benzoic Acids," *Applied and Environmental Microbiology*, Apr. 1993; p. 1162–1167, vol. 59, No. 4. [Abstract].

Ramanand et al., "Reductive Dehalogenation of Chlorinated Benzenes and Toluenes Under Methanogenic Conditions," *Applied and Environmental Microbiology*, Oct. 1993; p. 3266–3272, vol. 59, No. 10. [Abstract].

Wu et al., "Establishment of a Polychlorinated Biphenyl–Dechlorinating Microbial Consortium, Specific for Doubly Flanked Chlorines, in a Defined, Sediment–Free Medium", *Applied and Environmental Microbiology*, Jan. 2000, p. 49–53, vol. 66, No. 1. [Abstract].

Bedard et al., "Complete Reductive Dehalogenation of Brominated Biphenyls by Anaerobic Microorganisms in Sediment", *Applied and Environmental Microbiology*, Mar. 1998, p. 940–947, vol. 64, No. 3. [Abstract].

Cole et al., "Isolation and Characterization of a Novel Bacterium Growing Via Reductive Dehalogenation of 2–Chlorophenol", *Applied and Environmental Microbiology*, Oct. 1994, p. 3536–3542, vol. 60, No. 10. [Abstract].

Holliger et al., "A Highly Purified Enrichment Culture Couples the Reductive Dechlorination of Tetrachloroethene to Growth", *Applied and Environmental Microbiology*, Sep. 1993, p. 2991–2997, vol. 59. No. 9. [Abstract].

Madsen et al., "Isolation and Characterization of an Anaerobic Chlorophenol–Transforming Bacterium", *Applied and Environmental Microbiology*, Sep. 1992, p. 2874–2878, vol. 58, No. 9. [Abstract].

Mohn et al., "Limited Degradation of Chlorophenols by Anaerobic Sludge Granules", *Applied and Environmental Microbiology*, Jul. 1992, p. 2131–2136, vol. 58, No. 7. [Abstract].

De Bruin et al., "Complete Biological Reductive Transformation of Tetrachloroethene to Ethane", *Applied and Environmental Microbiology*, Jun. 1992, p. 1996–2000, vol. 58, No. 6. [Abstract].

Mohn et al., "Reductive Dehalogenation of Chlorophenols by Desulfomonile tiedjei DCB–1", *Applied and Environmental Microbiology*, Apr. 1992, p. 1367–1370, vol. 58, No. 4. [Abstract].

So et al., "Initial Reactions in Anaerobic Alkane Degradation by a Sulfate Reducer, Strain AK–01", *Applied and Environmental Microbiology*, Dec. 1999, p. 5532–5540, vol. 65, No. 12. [Abstract].

Coates et al., "Anaerobic Degradation of Polycyclic Aromatic Hydrocarbons and Alkanes in Petroleum–Contaminated Marine Harbor Sediments", *Applied and Environmental Microbiology*, Sep. 1997, p. 3589–3593, vol. 63, No. 9. [Abstract].

So et al., "Isolation and Characterization of a Sulfate–Reducing Bacterium that Anaerobically Degrades Alkanes", *Applied and Environmental Microbiology*, Jul. 1999, p. 2969–2976, vol. 65, No. 7. [Abstract].

Laue et al., "Taurine Reduction in Anaerobic Respiration of *Bilophila wadsworthia* RZATAU", *Applied and Environmental Microbiology*, May 1997, p. 2016–2021, vol. 63, No. 5. [Abstract].

Wischnak et al., "*Pseudomonas* sp. Strain 273, an Aerobic α, ω–Dichloroalkane Degrading Bacterium", *Applied and Environmental Microbiology*, Sep. 1998, p. 3507–3511, vol. 64, No. 9. [Abstract].

Ye et al., "Anaerobic Dechlorination of Polychlorobiphenyls (Aroclor 1242) by Pasteurized and Ethanol–Treated Microorganisms from Sediments", *Applied and Environmental Microbiology*, Apr. 1992, p. 1110–1114, vol. 58, No. 4. [Abstract].

Wiegel et al., "Anaerobic Dehalogenation of Hydroxylated Polychlorinated Biphenyls by *Desulfitobacterium dehalogenans*", *Applied and Environmental Microbiology*, May 1999, p. 2217–2221, vol. 65, No. 5. [Abstract].

Miguez et al., "Monitoring Methanotrophic Bacteria in Hybrid Anaerobic–Aerobic Reactors with PCR and a Catabolic Gene Probe", *Applied and Environmental Microbiology*, Feb. 1999, p. 381–388, vol. 65, No. 2. [Abstract].

Bedard et al., "Brominated Biphenyls Prime Extensive Microbial Reductive Dehalogenation of Aroclor 1260 in Housatonic River Sediment", *Applied and Environmental Microbiology*, May 1998, p. 1786–1795, vol. 64, No. 5. [Abstract].

Wu et al., "Microbial Reductive Dechlorination of Aroclor 1260 in Anaerobic Slurries of Estuarine Sediments", *Applied and Environmental Microbiology*, Mar. 1998, p. 1052–1058, vol. 64, No. 3. [Abstract].

Sanford et al., "Characterization of *Desulfitobacterium chlororespirans* sp. nov., Which Grows by Coupling the Oxidation of Lactate to the Reductive Dechlorination of 3–chloro–4–hydroxybenzoate", *Applied and Environmental Microbiology*, Oct. 1996, p. 3800–3808, vol. 62, No. 10. [Abstract].

Nicholson et al., "Reductive Dechlorination of Chlorophenols by a Pentachlorophenol–Acclimated Methanogenic Consortium", *Applied and Environmental Microbiology*, Jul. 1992, p. 2280–2286, vol. 58, No. 7. [Abstract].

Von Wintzingerode et al., "Phylogentic Analysis of an Anaerobic, Trichlorobenzene–Transforming Microbial Consortium", *Applied and Environmental Microbiology*, Jan. 1999, p. 283–286, vol. 65, No. 1. [Abstract].

Van Eekert et al., "Degradation and Fate of Carbon Tetrachloride in Unadapted Methanogenic Granular Sludge", *Applied and Environmental Microbiology*, Jul. 1998, p. 2350–2356, vol. 64, No. 7. [Abstract].

Bradley et al., "Anaerobic Oxidation of [1,2–$^{14}$C]Dichloroethene Under Mn(IV)–Reducing Conditions", *Applied and Environmental Microbiology*, Apr. 1998, p. 1560–1562, vol. 64, No. 4. [Abstract].

Fish et al., "Biotransformations of Aroclor 1242 in Hudson River Test Tube Microcosms", *Applied and Environmental Microbiology*, Dec. 1994, p. 4289–4296, vol. 60, No. 12. [Abstract].

Locher et al., "Uptake of 4–Toluene Sulfonate by Comamonas testosteroni T–2", *J. Bacteriol.*, Feb. 1993, p. 1075–1080, vol. 175, No. 4. [Abstract].

Sun et al., "Isolation and Characterization of *Desulfovibrio dechlororacetivorans* sp. nov., a Marine Dechlorinating Bacterium Growing by Coupling the Oxidation of Acetate to the Reductive Dechlorination of 2–Chlorophenol", *Applied and Environmental Microbiology*, Jun. 2000, p. 2408–2413, vol. 66, No. 6. [Abstract].

Boyle et al., "Isolation from Estaurine Sediments of a Desulfovibrio Strain Which Can Grow on Lactate Coupled to the Reductive Dehalogenation of 2,4,6–Tribromophenol", *Applied and Environmental Microbiology*, Mar. 1999, p. 1133–1140, vol. 65, No. 3. [Abstract].

Dojka et al., "Microbial Diversity in a Hydrocarbon–and Chlorinated–Solvent–Contaminated Aquifer Undergoing Intrinsic Bioremediation", *Applied and Environmental Microbiology*, Oct. 1998, p. 3869–3877, vol. 64, No. 10. [Abstract].

Hur et al., "Metabolism of Chlorofluorocarbons and Polybrominated Compounds by Pseudomonas putida G786(pHG–2) via an Engineered Metabolic Pathway", *Applied and Environmental Microbiology*, Nov. 1994, p. 4148–4154, vol. 60, No. 11. [Abstract].

EPA, "Sequential Anaerobic/Aerobic Biodegradation of PCE at Watertown, Massachusetts", Cost and Performance Report, Mar. 2000.

Baker et al., *Bioremediation*, p. 304, McGraw–Hill, Inc.

* cited by examiner

METHOD AND APPARATUS FOR ANAEROBICALLY DEGRADING POLLUTANTS WITH ALKANES

CROSS REFERENCE TO RELATED APPLICATIONS

This application is a continuation-in-part of U.S. application Ser. No. 09/275,320 filed Mar. 24, 1999 now U.S. Pat. No. 6,245,235, which is a continuation-in-part of U.S. application Ser. No. 08/767,750 filed Dec. 17, 1996, now U.S. Pat. No. 5,888,396 issued Mar. 30, 1999, each of which is incorporated herein by reference. This application also claims the benefit of U.S. Provisional Application Ser. No. 60/234,482 filed Sep. 22, 2000.

FIELD OF THE INVENTION

The present invention relates to degradation of pollutants using anaerobic methods. Alkanes, e.g., methane, ethane, propane and butane, are used to effectively degrade pollutants such as tetrachloroethylene. The alkanes may accelerate anaerobic respiration.

BACKGROUND INFORMATION

Tetrachloroethylene (PCE) and carbon tetrachloride (CT) are two metal degreasing and dry cleaning solvents which are recalcitrant pollutants detected in the soil and groundwater at many contaminated sites. Under aerobic conditions, PCE and CT have traditionally been considered nonbiodegradable. Under anaerobic conditions, PCE and CT may be reductively dechlorinated by mixed microbial populations to less-chlorinated ethenes.

PCE is currently remediated using chemicals that enhance anaerobic degradation within the subsurface. Carbon sources such as acetate and methanol are injected into the subsurface where oxygen is limited or absent and alternate electron acceptors such as nitrate or sulfate are available. Chemicals that slowly release hydrogen in groundwater are also used to accelerate anaerobic degradation processes.

PCE may not be very susceptible to aerobic metabolic pathways. Research conducted under aerobic conditions using pure cultures and limited consortia of butane-utilizing bacteria has indicated that butane oxidation may not degrade or cometabolize PCE even though butane enrichment results in the expression of a wide variety of oxygenases during butane oxidation (Hamamura N., R. Storfa, L. Semprini, and D. J. Arp. "Diversity in Butane Monooxygenases among Butane-Grown Bacteria. *Appl. Environ. Microbiol.* 65(10):4586–4593, 1999).

The bioremediation of various pollutants using butane-utilizing bacteria is disclosed in U.S. Pat. Nos. 5,888,396, 6,051,130, 6,110,372 and 6,156,203, and U.S. application Ser. No. 09/275,320, which are incorporated herein by reference. The disclosed methods primarily focus on the cometabolism of pollutants using butane-utilizing bacteria under aerobic conditions.

SUMMARY OF THE INVENTION

In accordance with the present invention, alkanes are used to degrade pollutants such as recalcitrant chlorinated compounds under anaerobic conditions, e.g., through reductive processes such as dechlorination. In a preferred embodiment, butane is used as a low molecular weight organic compound which serves as an electron donor under anaerobic conditions.

An aspect of the present invention is to provide a method of degrading a pollutant. The method includes treating the pollutant by supplying an alkane in the substantial absence of oxygen to stimulate the growth of anaerobic bacteria which degrade the pollutant.

Another aspect of the present invention is to provide an anaerobic bioremediation system. The system includes means for supplying an alkane to a contaminated site in the substantial absence of oxygen to stimulate the growth of anaerobic bacteria which degrade a pollutant at the contaminated site.

A further aspect of the present invention is to provide an in-situ anaerobic bioremediation system which includes a source of an alkane, and at least one injector in flow communication with the source of the alkane.

These and other aspects of the present invention will be more apparent from the following description.

DETAILED DESCRIPTION

The present invention utilizes alkanes, preferably butane, under anaerobic conditions to remediate pollutants such as PCE. Although the use of butane is primarily described herein, it is to be understood that other alkanes may also be used in accordance with the present invention. Based on its relatively low molecular weight, butane may be a preferred electron donor. In addition, butane is non-toxic. The high solubility of butane makes this compound ideally suited to accelerate the transformation of aerobic conditions to anaerobic by accelerating the growth of butane-utilizing microorganisms initially in the presence of oxygen to produce carbon dioxide. With the transformation to an anaerobic state and in the presence of an alternate electron acceptor such as carbon dioxide, nitrate or sulfate, butane may serve as an electron donor and carbon source, thereby accelerating the reductive dechlorination of recalcitrant chlorinated compounds (such as PCE) to less chlorinated compound (such as TCE). With the conversion of PCE to TCE, the reductive dechlorination process can be halted to avoid production of toxic intermediates such as vinyl chloride. TCE and any metabolites or intermediates produced by the initial anaerobic process may subsequently be amenable to destruction under aerobic conditions, e.g., by butane oxidation. This can be achieved in the field, for example, by alternating the anaerobic/aerobic processes through butane injection only and butane/oxygen injection. The anaerobic/aerobic cycle may be conducted repeatedly until the PCE and TCE have been degraded.

Butane is highly soluble and large radii of influence can be realized in the field at butane injection wells, thus making butane injection highly suitable for anaerobic remediation. Butane is heavier than air and sinks, thus driving molecular oxygen from soil pore space or subsurface aquifers. Consequently, butane can be utilized to drive molecular oxygen out of a system by encouraging the growth of butane-utilizing bacteria, thereby decreasing the oxygen concentration and increasing carbon dioxide concentration as a result of microbial aerobic respiration processes. When the oxygen is depleted from the system, the aerobic microorganisms will die and the anaerobic microorganisms will flourish. As the anaerobic microorganisms flourish, butane may serve as an electron donor and carbon source, and carbon dioxide or other compounds such as sulfate or nitrate may serve as the electron acceptor, thereby completing the anaerobic degradation cycle.

Pollutants which may be remediated in accordance with the present invention include halogenated and non-halogenated aromatics and aliphatics, e.g., chlorinated aliphatic and aromatic compounds, nitrogen-based aromatics (explosives), PCBs, pesticides, aliphatic and aromatic hydrocarbons, PAHs and hydrocarbons partially or fully replaced by halogen atoms. Other compounds include esters, ethers, aldehydes, amines, dioxin-and related compounds, herbicides, ketones, phenols, sulfur-containing organics and alcohols. Methyl tertiary butyl ether (MTBE) and ethylene dibromide (EDB) may also be remediated. Chlorophenolic compounds (chlorophenols, chloroguiacols, and chlorocatechols) found in pulp mill effluent may also be treated. Additional compounds include low-level radioactive wastes, chlorate (pulp bleaching), and cyanide and arsenic compounds. Halogenated compounds containing at least four halogen atoms are particular pollutants which may be effectively treated by the anaerobic methods of the present invention.

Some of the hydrocarbon pollutants which may be degraded by the present anaerobic and anaerobic/aerobic methods include chlorinated aliphatics, chlorinated aromatics and non-chlorinated aromatics and aliphatics, with chlorinated aliphatic hydrocarbons being of particular interest. Specific hydrocarbon pollutants include tetrachloroethylene (PCE), carbon tetrachloride (CT), trichloroethene (TCE), trichloroethane (TCA) (e.g., 1,1,2-trichloroethane and 1,1,1-trichloroethane), methylene chloride, 1,1-dichloroethane, chloroform, 1,2-dichloropropane, dibromochloromethane, 2-chloroethylvinyl ether, chlorobenzene, 1,2-dichloroethane, bromodichloromethane, trans-1,3-dichloropropene, cis-1,3-dichloropropene, bromoform, chloromethane, bromomethane, vinyl chloride, chloroethane, 1,1-dichloroethene, trans-1,2-dichloroethene, polychlorinated biphenyl (PCB), dichlorobenzenes, cis-1,2-dichloroethene, dibromomethane, 1,4-dichlorobutane, 1,2,3-trichloropropane, bromochloromethane, 2,2-dichloropropane, 1,2-dibromoethane, 1,3-dichloropropane, bromobenzene, chlorotoluenes, trichlorobenzenes, trimethylbenzenes, trans-1,4-dichloro-2-butene and butylbenzenes. Additional pollutants include petroleum compounds such as crude oil, refined oil, Nos. 2, 4 and 6 fuel oils, gasoline, benzene, toluene, ethylbenzene and xylene (BTEX), and creosote and pesticides.

The bioremediation process of the present invention is preferably performed in-situ to remove such contaminants from various environments including aqueous systems, ground water, capillary fringe areas, vadose zones, soil and bedrock. Aqueous systems suitable for treatment include drinking water, groundwater, surface water, industrial waste water and the like.

A preferred embodiment of the present invention provides an in-situ method and apparatus for the degradation of pollutants. A butane substrate is injected into a contaminated site to degrade the pollutants. As used herein, the term "butane substrate" includes liquids and gases in which butane is present in sufficient amounts to stimulate substantial growth of butane-utilizing bacteria. Butane is preferably the most prevalent compound of the butane substrate on a weight percent basis, and typically comprises at least about 10 weight percent of the butane substrate. The other constituents of the butane substrate may include any suitable compounds, including inert gases and/or other alkanes such as methane, ethane and propane. The butane substrate preferably comprises at least about 50 weight percent butane. More preferably, the butane substrate comprises at least about 90 weight percent butane. In a particular embodiment, the butane substrate comprises at least about 99 weight percent n-butane. The butane may contain straight (n-butane) and/or branched chain compounds such as iso-butane.

The butane substrate may serve as an electron donor and carbon source, or possibly an electron acceptor. Butane and its aerobic breakdown products are candidates for electron donors during anaerobic respiration. They include 1-butanol, butyraldehyde, and butyrate. Butane is an ideal electron donor to accelerate the anoxic/anaerobic degradation of pollutants since butane may serve as a primary substrate supporting microbial growth of indigenous microbial populations.

In-situ bioremedial processes that may be used in accordance with the present invention include the use of indigenous butane-utilizing microorganisms and/or the injection of non-indigenous butane-utilizing microorganisms into the surface or subsurface. Indigenous microorganisms can be stimulated to flourish by the addition of the butane substrate and, optionally, bacterial nutrients that may be limited in the ecosystem under scrutiny. Suitable bacterial nutrients include nitrogen-containing compounds and phosphorous-containing compounds. For example, the bacterial nutrients may comprise ammonia, nitrate, ammonium chloride and sodium orthophosphate salts, and combinations thereof.

Figure 1:
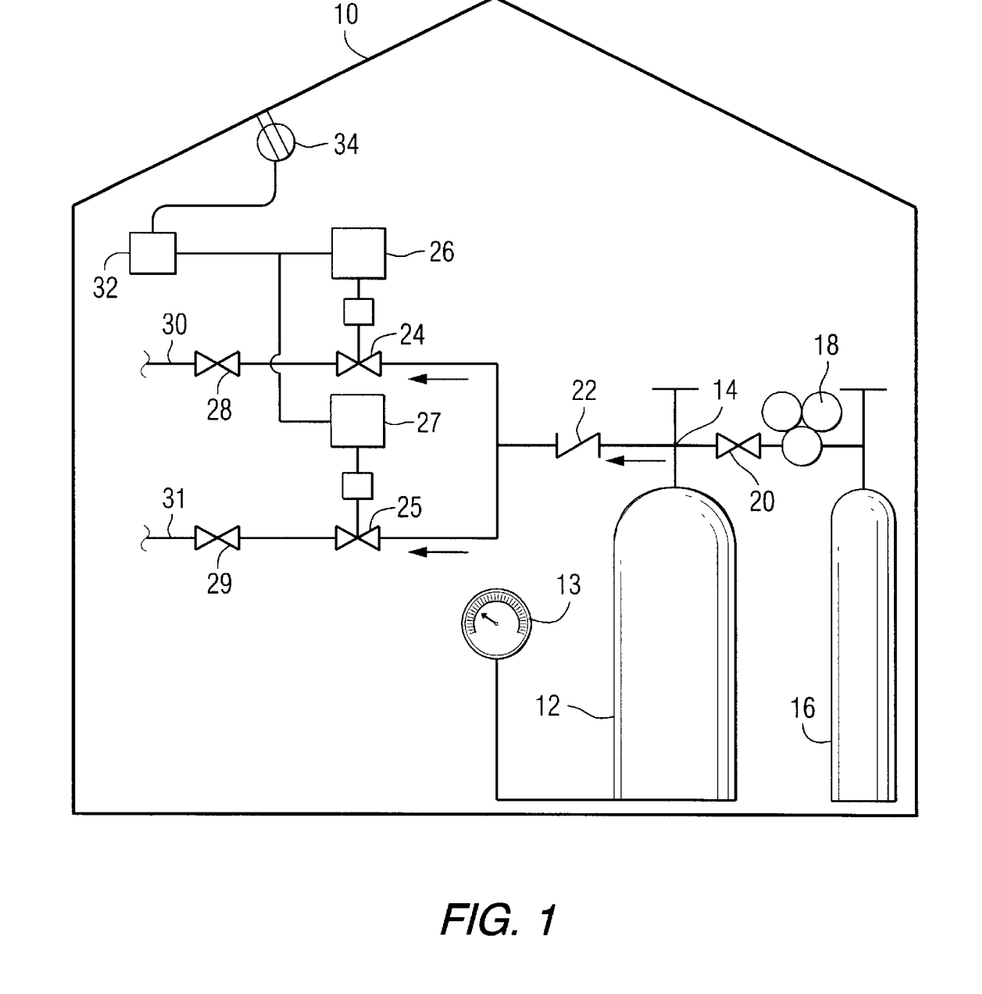
FIG. 1 is a partially schematic illustration of an in-situ butane injection system in accordance with an embodiment of the present invention.

FIG. 1 schematically illustrates an in-situ butane injection system in accordance with an embodiment of the present invention. The butane injection system may be contained within a shed 10 which houses a butane cylinder 12. The butane cylinder 12 rests on a scale 13 which is used to measure the amount of butane contained within the cylinder 12. The cylinder 12 is connected to a dual port valve 14. A helium or nitrogen cylinder 16 is also contained within the shed 10. The cylinder 16 is connected through a regulator 18 and a gate valve 20 to the dual port valve 14. A check valve 22 is positioned between a single line from the butane cylinder 12 and two branched lines leading to solenoid valves 24 and 25. A digital timer 26 controls the solenoid valve 24, while another digital timer 27 controls the solenoid valve 25. Gate valves 28 and 29 are positioned downstream from the solenoid valves 24 and 25, respectively. The gate valve 28 communicates with a butane injection well line 30. The gate valve 29 communicates with another butane injection well line 31. A power reset assembly 32 is connected between the digital timers 26 and 27 and an electrical power source 34 such as a GFCI receptacle (120 VAC).

The flow of the butane substrate from the cylinder 12 through the butane injection well lines 30 and 31 is controlled by the in-situ butane injection system shown in FIG. 1. The flow of the butane substrate to the injection well lines 30 and 31 may be constant or may be pulsed. In one embodiment, the butane substrate is supplied periodically to the lines 30 and 31 at desired intervals. For example, butane pulses may be supplied from 0.01 second to several minutes per hour at any suitable flow rate. The overall butane treatment time may typically range from about one week to two years or more.

Figure 2:
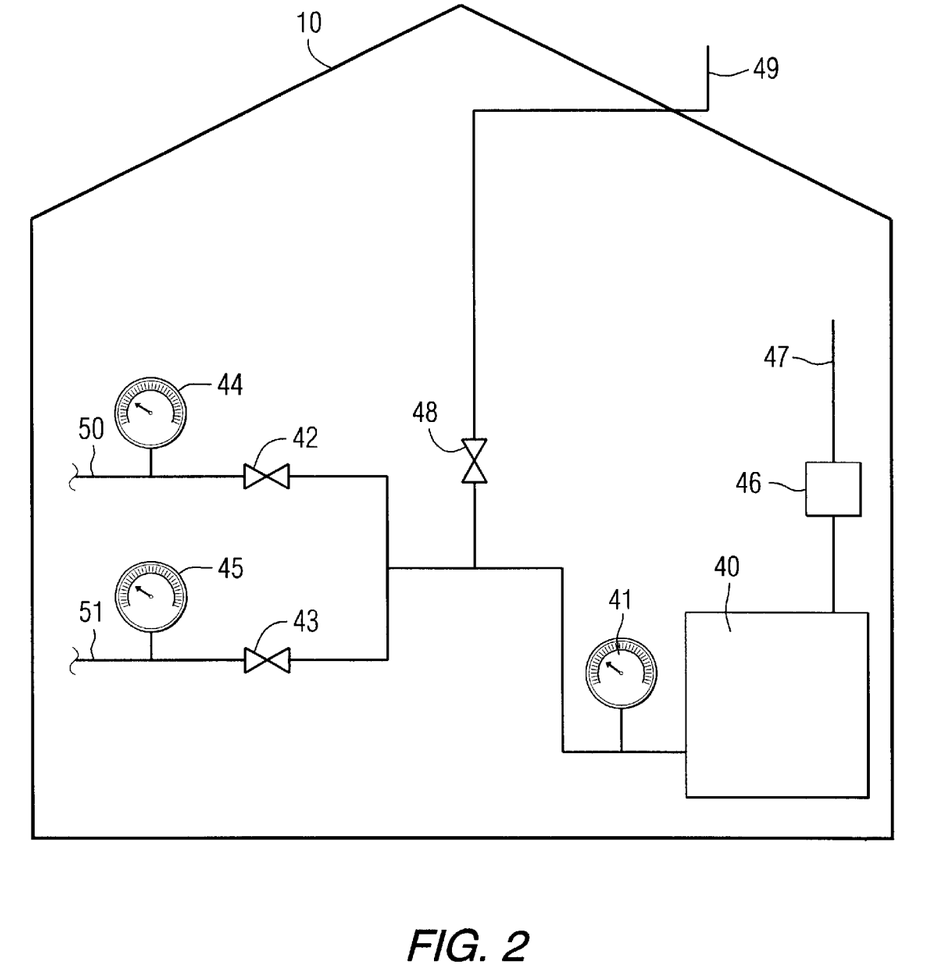
FIG. 2 is a partially schematic illustration of an in-situ air injection system which may be used during the aerobic phase of an anaerobic/aerobic treatment process in accordance with an embodiment of the present invention.

For anaerobic treatment, a butane injection system as shown in FIG. 1 may be used alone. Alternatively, for combined anaerobic/aerobic treatments, a suitable air injection system may be used. FIG. 2 schematically illustrates an in-situ air injection system in accordance with an anaerobic/aerobic embodiment of the present invention. The air injection system is housed within the shed 10. An air compressor 40 supplies air through a system gauge 41 to gate valves 42 and 43. A flow gauge 44 is located downstream from the gate valve 42, while another flow gauge 45 is located downstream from the gate valve 43. The air compressor 40 is electrically connected through a fuse panel disconnect system 46 to an electrical power supply 47 such as a 220 volt AC power supply. A dilution valve 48 is connected to the line between the system gauge and the gate valves 42 and 43. The dilution valve 48 is connected to a vent 49. An air injection well line 50 communicates with the gate valve 42, while another air injection well line 51 communicates with the gate valve 43. The gate valves 42 and 43 are used to equalize the air flow to each of the air injection well lines 50 and 51.

The flow of air from the compressor 40 through the air injection well lines 50 and 51 is controlled by the in-situ air injection system shown in FIG. 2. During aerobic treatment stages, the flow of air or other types of oxygen-containing gases to the injection well lines 50 and 51 may be constant or may be pulsed. The oxygen-containing gas may be supplied periodically to the lines 50 and 51 at desired intervals. For example, air may be supplied from 0.1 second to 50 minutes per hour at any suitable flow rate. The overall aerobic treatment time may typically range from one week to two years or more.

Figure 3:
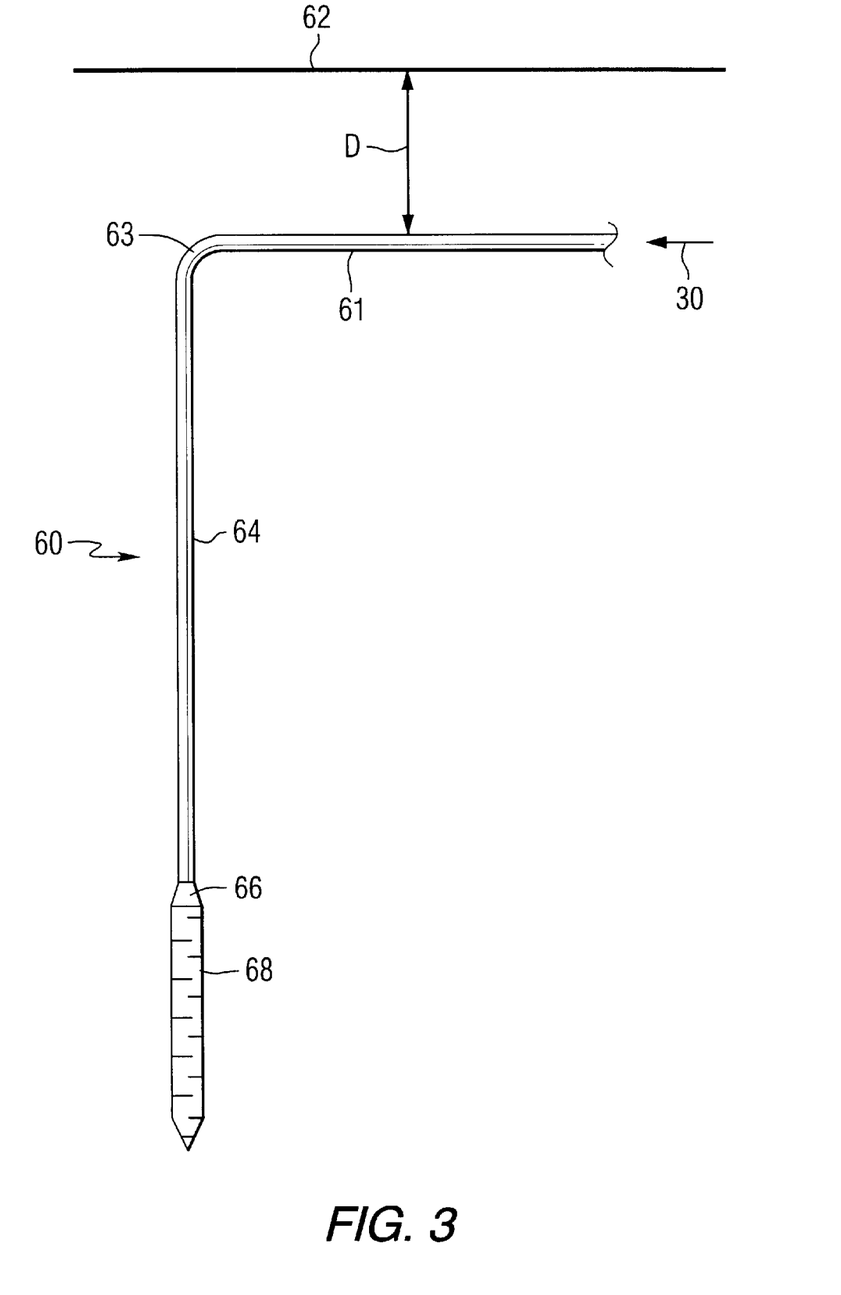
FIG. 3 is a partially schematic illustration of a butane injection well in accordance with an embodiment of the present invention.

FIG. 3 illustrates a butane injection well 60 in accordance with an embodiment of the present invention. The butane well injection line 30 shown in FIG. 1 is connected to the butane injection well 60 by a horizontal pipe 61 which is positioned a distance D below finish grade 62. The distance D is preferably at least 3 feet. The horizontal pipe 61 is connected by an elbow 63 to a vertical pipe 64. The vertical pipe 64 may have any suitable diameter and length. For example, the vertical pipe 64 may comprise a 1 inch outside diameter iron pipe having a length of from about 1 to about 100 or 500 feet or more. A fitting 66 is connected to the end of the vertical pipe 64. For example, the fitting 66 may be a 1 inch by 1 inch increaser fitting. A well point 68 is connected to the distal end of the vertical pipe 64 by the fitting 66. The well point 68 may be of any suitable construction which adequately permits dispersion of the butane into the treatment site. For example, the well point 68 may comprise a slotted stainless steel tube having an outside diameter of 1 inch and a length of 2 feet. Butane supplied from the butane injection well line 30 to the butane injection well 60 is introduced via the well point 68 into the treatment site at the desired location.

Although two butane injection well lines 30 and 31 and two air injection well lines 50 and 51 are shown in FIGS. 1 and 2, single lines or any suitable number of multiple injection well lines may be used. In addition, the lines may be connected to the butane and air injection wells by any suitable manifold system.

Figure 4:
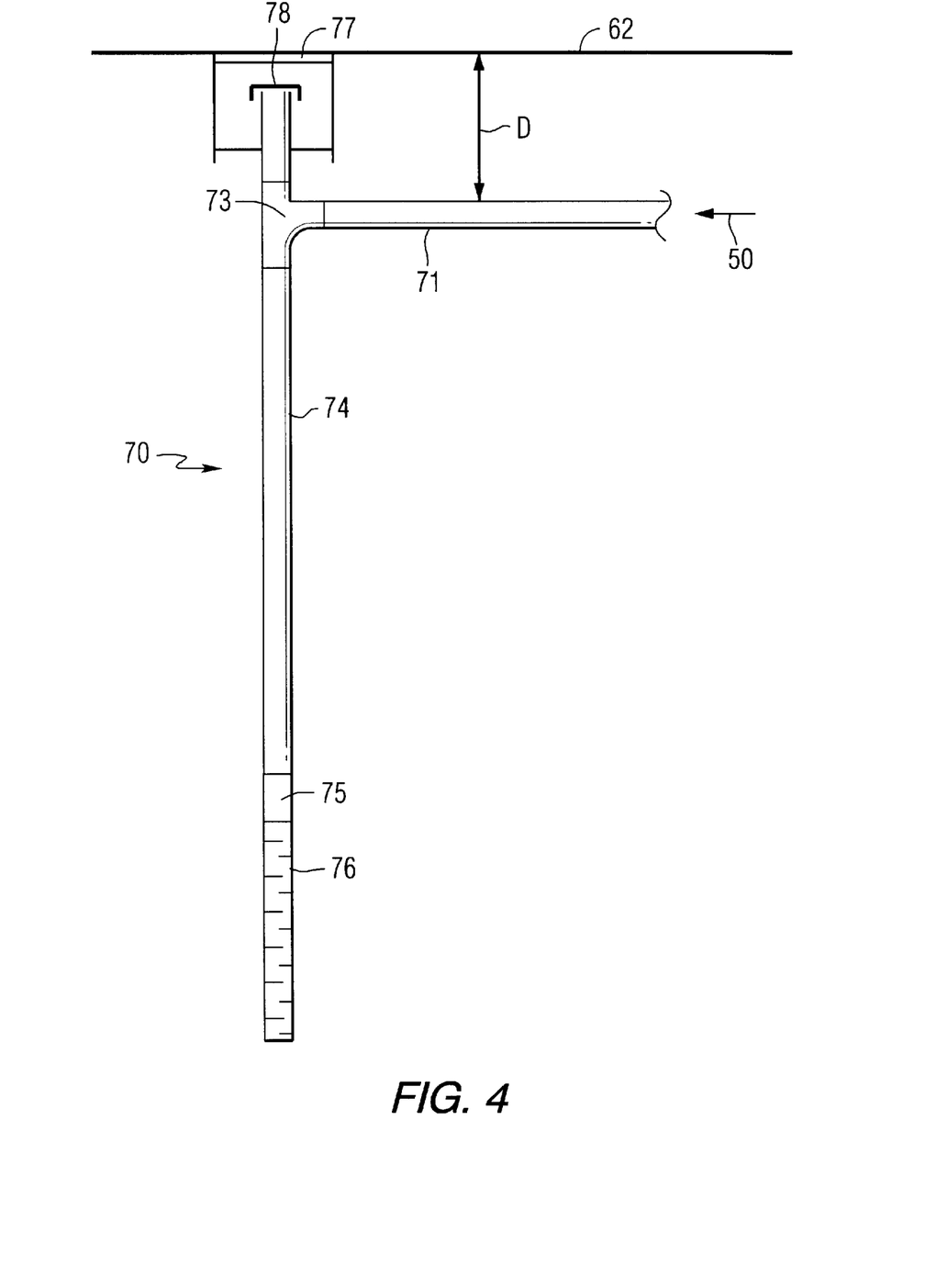
FIG. 4 is a partially schematic illustration of an air injection well which may be used during the aerobic phase of an anaerobic/aerobic treatment process in accordance with an embodiment of the present invention.

FIG. 4 illustrates an air injection well 70 which may used in accordance with the anaerobic/aerobic embodiment of the present invention. The air injection well line 50 shown in FIG. 2 is connected to a horizontal pipe 71 of the air injection well 70. The horizontal pipe 71 is located a distance D below the finish grade 62, which is preferably at least 3 feet. A tee joint 73 connects the horizontal pipe 71 to a vertical pipe 74. For example, the tee joint 73 may have outside dimensions of 2 inch by 2 inch by 2 inch. The vertical pipe 74 may have any suitable diameter and length. For example, the vertical pipe 74 may comprise a 2 inch outside diameter PVC pipe having a length of from about 1 to about 100 or 500 feet or more, depending upon the desired depth of the air injection well 70. A fitting 75 connects the distal end of the vertical pipe 74 to a well screen 76. The fitting 75 may, for example, comprise a 2 inch by 2 inch coupler fitting. The well screen 76 may be of any suitable construction which adequately allows dispersion of air or other oxygen-containing gases into the treatment zone. For example, the well screen 76 may comprise a slotted PVC tube having an inside diameter of 2 inches and a length of 2 feet. Air or another oxygen-containing gas supplied from the air injection well line 50 to the air injection well 70 is dispersed via the well screen 46 at the desired location within the contaminated site. A road box 77 including a cap 78 is connected to the tee joint 73 in order to protect the top of the well 70 and to allow access to the well 70 for sampling purposes. In addition, the road box 77 allows access to the well 70 for manual or automatic addition of non-indigenous bacteria and/or bacterial nutrients such as nitrogen-containing compounds and phosphorous-containing compounds, if desired.

Although the butane injection well 60 and the air injection well 70 shown in FIGS. 3 and 4 are separate from each other, both butane and air could be supplied through the same injection well during the aerobic treatment stage. In addition to in-situ remediation methods and apparatus, e.g., as shown in FIGS. 1–4, ex-situ remediation methods and apparatus may be used. For example, ex-situ bioreactors as described in U.S. Pat. No. 5,888,396 may be operated under anaerobic conditions in order to degrade various pollutants.

Under anaerobic conditions, carbon substrates may be required as sources of electrons, for example:

PCE+H⁺+2e⁻=TCE+Cl⁻.

Recalcitrant chlorinated compounds such as PCE may undergo reductive dechlorination as follows:

PCE>TCE>1,2DCE>vinyl chloride>ethylene>CO₂.

Although toluene ($C_7H_8$) has been proposed as an electron donor for the reductive dechlorination of PCE to dichloroethene (DCE) in anaerobic aquifer microcosms, toluene is toxic and a priority pollutant, unlike butane.

Conversion of the chlorinated aliphatic compounds to less chlorinated alkenes and alkanes via reductive dechlorination can produce intermediates that pose a threat to public health such as vinyl chloride, a known human carcinogen. However, if the anaerobic degradation of PCE is halted at the formation of TCE, where the remediation strategy can switch to aerobic degradation processes using oxygen and butane-utilizing bacteria, then the formation of toxic byproducts is reduced or eliminated. Under these conditions, PCE and other recalcitrant compounds such as carbon tetrachloride can be degraded through reductive dechlorination to other less chlorinated compounds susceptible to butane oxidation via aerobic pathways.

An embodiment of the present invention provides reductive dechlorination of PCE by coupling the oxidation of butane under anaerobic conditions. Electron acceptors including nitrate, nitrite, sulfate, sulfite, iron, manganese, other metals, carbon dioxide, helium, nitrogen and other inert gases may be utilized. In-situ additions of alternate electron acceptors may be used if such chemicals are not present in sufficient concentration in an aquifer, i.e., enhanced natural attenuation. Butane injection may be used to accelerate the transformation of an aerobic aquifer to an anaerobic aquifer.

Suitable bacteria which may be utilized in accordance with the anaerobic or anaerobic/aerobic methods of the present invention include the following Groups.

| Group 1: | The Spirochetes |
|---|---|
| Group 2: | Microaerophilic, motile, helical/vibroid, gram-negative bacteria |
| Group 3: | Nonmotile (or rarely motile), gram-negative bacteria |
| Group 4: | Gram-negative microaerophilic rods and cocci |
| Group 5: | Facultatively anaerobic gram-negative rods |
| Group 6: | Gram-negative, anaerobic, straight, curved, and helical bacteria |
| Group 7: | Dissimilatory sulfate- or sulfur-reducing bacteria |
| Group 8: | Anaerobic gram-negative cocci |
| Group 10: | Anoxygenic phototrophic bacteria |
| Group 11: | Phototrophic bacteria |
| Group 12: | Chemolithotrophic bacteria and associated organisms |
| Group 13: | Budding and/or appendaged bacteria |
| Group 14: | Sheathed bacteria |
| Group 15: | Nonphotosynthetic, nonfruiting gliding bacteria |
| Group 16: | The fruiting, gliding bacteria and the Myxobacteria |
| Group 17: | Gram-positive cocci |
| Group 18: | Endospore-forming gram-positive rods and cocci |
| Group 19: | Regular, nonsporing, gram-positive rods |
| Group 20: | Irregular, nonsporing, gram-positive rods |
| Groups 22–29: | The actinomycetes |
| Group 22: | Nocardioform actinomycetes |
| Group 23: | Genera with multiocular sporangia |
| Group 24: | Actinoplanetes |
| Group 25: | Streptomycetes and related genera |
| Group 26: | Maduromycetes |
| Group 27: | Thermomonospora and related genera |
| Group 28: | Thermoactinomycetes |
| Group 29: | Genus Glycomyces, Genus Kitasatospira and Genus Saccharothrix |
| Group 30: | The mycoplasmas - cell wall-less bacteria |
| Group 31: | The methanogens |
| Group 32: | Archaeal sulfate reducers |
| Group 33: | Extremely halophilic, archaeobacteria (halobacteria) |
| Group 34: | Cell wall-less archaeobacteria |
| Group 35: | Extremely thermophilic and hyperthermophilic S0-metabolizers |

As used herein, the term "anaerobic bacteria" includes bacteria which live in the substantial absence of oxygen, including facultative anaerobes and microaerophilic bacteria which are capable of surviving at low levels of oxygen. They do not require strict anaerobic conditions such as the obligate anaerobes. Acidophilic, alkaliphilic, anaerobe, anoxygenic, autotrophic, chemolithotrophic, chemoorganotroph, chemotroph, halophilic, methanogenic, neutrophilic, phototroph, saprophytic, thermoacidophilic, and thermophilic bacteria may be used. Degradation of complex organic pollutants in-situ preferably uses the interaction of microbial populations (consortia). Butane or other alkane-utilizing bacteria may degrade pollutants through direct metabolism, sequential metabolism, reductive metabolism, dehalogenation, or cometabolism.

The following describes a serum bottle study using butane to create an anaerobic environment to degrade PCE.

Sample Collection Methods

The groundwater samples used for this study were obtained from a dry cleaning facility considered to be a hazardous waste site. The groundwater had been impacted through the release of PCE.

Isolation Methods and Enrichment Transfers

The medium used for isolating, maintaining and conducting degradation experiments with butane-oxidizing bacteria for the groundwater sample was a sterile phosphate buffer solution.

The groundwater samples underwent butane enrichment every 72 hours for a period of three weeks to increase the density of butane-utilizing bacteria (aerobic).

The enrichment for the groundwater samples (2 total) were conducted in 125-ml serum bottles with 35 ml of sterile phosphate buffer solution and 10 milliliters of untreated site groundwater. Subsequent culture transfers (5.0 ml) were conducted with sterilized plastic syringes. The bottles were capped with red rubber plugs and crimped with aluminum seals. Each sample was handled aseptically, and all glassware, materials and supplies were sterilized by autoclaving. Butane and air were replaced in the headspace of each serum bottle using a dedicated, sterile, gas tight syringe with inert sampling valve (on/off lever). Butane was added at a concentration of 2% (vol/vol). A serum bottle of groundwater (heat sterilized) and phosphate buffer solutions was maintained as a control.

Microcosm Study

A microcosm study using static headspace methods was conducted to evaluate butane consumption and PCE degradation rates for the groundwater samples. Static headspace involves a partitioning of volatile components between the aqueous and vapor phases enclosed in a gas-tight vessel (serum bottle). A concentration of research grade butane in the range of 7000 to 9000 parts per million (ppm) and PCE in the range of 8 to 9 ppm was added to the headspace of each microcosm. Under these conditions, the serum bottles would become anaerobic after the oxidation of approximately 43 ppm of butane, as shown by the following calculation.

The reaction vessel is a 125 ml sealed culture bottle. The liquid added to the reaction vial is 45 ml. This liquid addition leaves 80 ml of available headspace containing air. Assuming the reaction vessel contains dry air at sea level the composition of the air is listed in Table 1.

TABLE 1

| Gas | % |
|---|---|
| Nitrogen | 78.08 |
| Oxygen | 20.95 |
| Argon | 0.93 |
| Carbon Dioxide | 0.03 |
| Neon | 0.0018 |
| Helium | 0.0005 |
| Krypton | 0.0001 |
| Xenon | 0.00001 |
| Other | 0.00759 |

To calculate the moles of oxygen available for oxidation we utilize the Ideal gas law: $PV=nRT$ and $n=W/M$.
Therefore:

$W=MPV/RT$.

Where:

$P$=partial pressure=$(0.2095)(1\ Atm.)=0.2095\ Atm$;

$V$=volume=$0.080\ L$;

$M$=molecular weight of oxygen=$31.988$;

R=gas constant=0.08206 L-atm/Deg K/mol;
T=temperature=20 Deg C.=293.1 Deg K;
W=Weight in grams; and
n=number of moles.

Therefore:

W=(31.988)(0.2095)(0.080)/(0.08206)(293.1)=0.02229 g.

Utilizing the system reaction equation:

$$C_4H_{10}+6.5O_2=4CO_2+5H_2O.$$

The maximum quantity of $C_4H_{10}$ which can be oxidized in the current system based on the available oxygen is 0.00343 g. Since the headspace volume is 0.080 L, we can now obtain the concentration:

$$PPM=(3.43 \text{ mg})/(0.080 \text{ L})=42.875 \text{ mg/L or ppm}.$$

The microcosm study evaluated butane and PCE disappearance at times 0, 2, 4 and 6 days. The serum bottles were capped with gray butyl rubber plugs coated with Teflon®, crimped with aluminum seals and placed on an orbital shaker. A 100-μl headspace sample from each serum bottle was analyzed using a gas chromatograph (GC) equipped with a photoionization detector (PID) and an electron capture detector (ECD), an isothermal oven and a Supelcowax 10™ wax phase capillary column.

Gas-tight syringes with inert sampling valves were used for on-column injections. The method was calibrated using external standards.

Microcosm Study Results

After ten days of enrichment transfers, the liquid suspension for the two groundwater samples demonstrated a significant increase in turbidity (i.e., the growth of butane-utilizing bacteria under aerobic conditions) with the exception of the control bottle. The cell suspension color in the microcosm was white.

Figure 5:
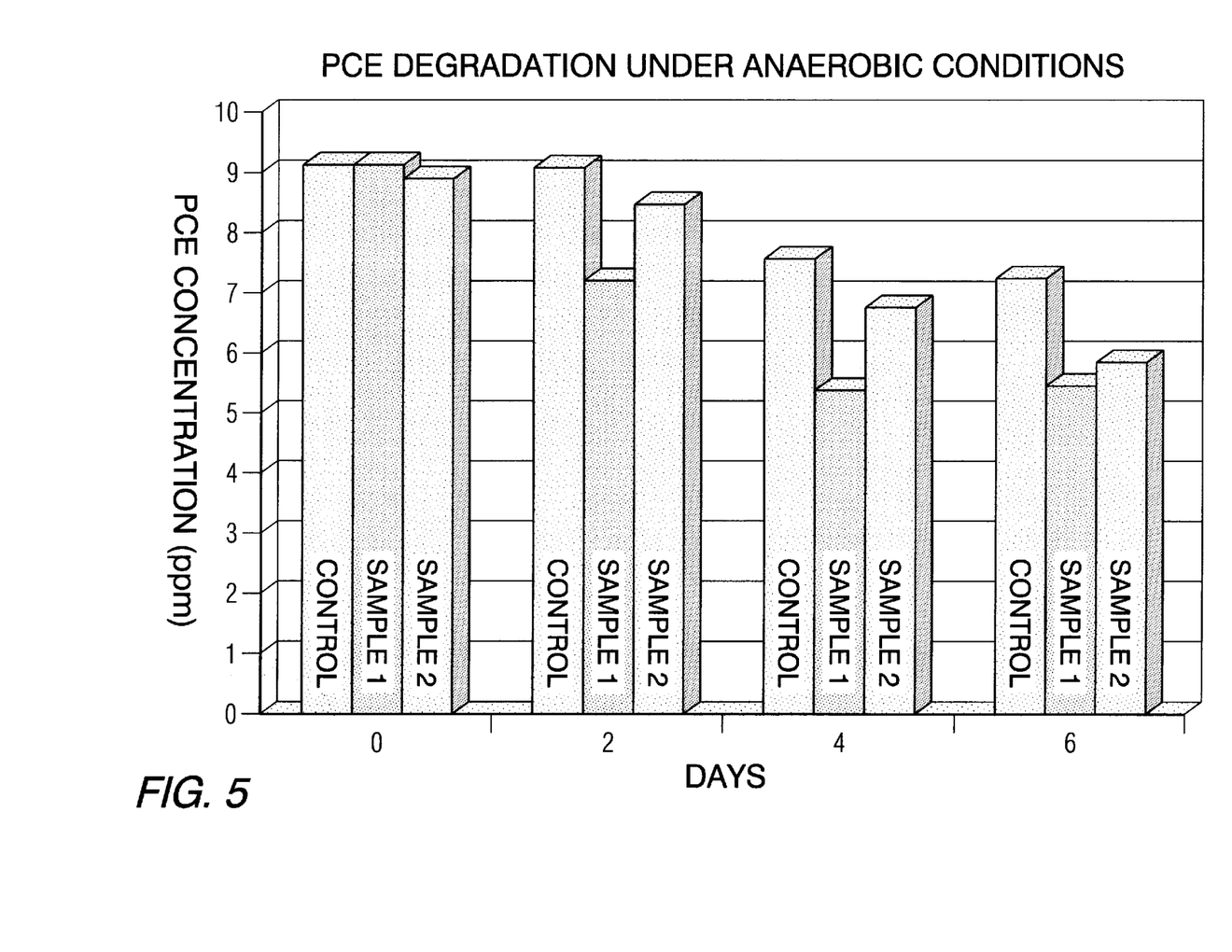
FIG. 5 is a graph of PCE concentration versus days of anaerobic treatment for a contaminated site which was remediated by butane injection in accordance with an embodiment of the present invention.

FIG. 5 summarizes the microcosm results showing PCE degradation in ppm for the groundwater Samples 1 and 2.

During the six-day study, the aerobic microbial populations in Samples 1 and 2 consumed butane until the reaction vessel or serum bottles had undergone complete transformation from aerobic conditions to anaerobic conditions. Table 2 lists the PCE concentrations (ppm) for the control and Samples 1 and 2 over the six-day study.

TABLE 2

| Sample ID | Time Zero | +2 Days | +4 Days | +6 Days |
|---|---|---|---|---|
| Control | 8812 | 8802 | 8785 | 8777 |
| Sample 1 | 8640 | 8425 | 8363 | 8309 |
| Sample 2 | 8156 | 7955 | 7636 | 7484 |

In Table 2 above, the total butane loss in the control bottle over the six day period was 35 ppm. This represents the abiotic loss. The butane loss in Sample 1 was 331 ppm. The loss in Sample 2 was 672 ppm. Accounting for the abiotic loss of 35 ppm, the serum bottles became anaerobic following the oxidation of approximately 43 ppm of butane. This would account for a total of 78 ppm of butane. The remaining butane loss observed, 253 ppm in Sample 1 and 594 ppm in Sample 2 can be attributed to anaerobic microbial activity in which butane was serving as the carbon source and electron donor, and the butane aerobic breakdown products such as 1-butanol, butyraldehyde, butyrate and, perhaps, carbon dioxide, generated during the initial oxidation of butane under aerobic conditions, served as the electron acceptor.

Samples 1 and 2 demonstrated PCE losses of 3.70 and 3.06 ppm, respectively, over the six-day period while the control demonstrated a loss of 1.87 ppm (abiotic loss). The difference between the total loss and abiotic loss is attributed to microbial activity under anaerobic conditions, as illustrated in FIG. 5.

Reductive dehalogenation may be the primary mechanism in the transformation of chlorinated organic compounds under anoxic or anaerobic conditions. Halogen atoms are sequentially removed from the molecule and replaced with hydrogen atoms. In this reaction, the halogenated hydrocarbon is used as the electron acceptor, not as a source of carbon.

The present process can be enhanced by injecting carbon dioxide or nitrogen gas with butane into the subsurface. In addition, nitrate could be added into the groundwater to accelerate anaerobic degradation processes.

Whereas particular embodiments of this invention have been described above for purposes of illustration, it will be evident to those skilled in the art that numerous variations of the details of the present invention may be made without departing from the invention as defined in the appended claims.

What is claimed is:

1. A method of degrading a pollutant, the method comprising treating the pollutant by supplying an alkane in the substantial absence of oxygen to stimulate the growth of anaerobic bacteria which degrade the pollutant, wherein the alkane comprises a butane substrate including at least about 10 weight percent butane.

2. The method of claim 1, wherein the butane substrate comprises at least about 50 weight percent butane.

3. The method of claim 1, wherein the butane substrate comprises at least about 90 weight percent butane.

4. The method of claim 1, wherein the pollutant is treated in-situ at a contaminated site.

5. The method of claim 4, further comprising supplying the butane substrate to the contaminated site continuously.

6. The method of claim 4, further comprising supplying the butane substrate to the contaminated site periodically.

7. The method of claim 4, further comprising subsequently supplying oxygen-containing gas to the contaminated site to aerobically treat the contaminated site.

8. The method of claim 7, further comprising supplying the oxygen-containing gas to the contaminated site periodically.

9. The method of claim 4, further comprising supplying butane-utilizing bacteria to the contaminated site.

10. The method of claim 9, wherein the butane-utilizing bacteria are non-indigenous to the contaminated site.

11. The method of claim 4, wherein the contaminated site comprises soil.

12. The method of claim 4, wherein the contaminated site comprises surface water.

13. The method of claim 4, wherein the contaminated site comprises groundwater.

14. The method of claim 4, wherein the contaminated site is below a ground surface.

15. The method of claim 4, wherein the contaminated site comprises a hydrocarbon pollutant.

16. The method of claim 4, wherein the contaminated site comprises at least one halogenated pollutant.

17. The method of claim 16, wherein the halogenated pollutant comprises at least one compound having at least 4 halogen atoms.

18. The method of claim 1, wherein the pollutant comprises tetrachloroethylene.

19. The method of claim 1, wherein the pollutant comprises carbon tetrachloride.

20. The method of claim 1, wherein the pollutant comprises methyl tertiary butyl ether.

21. The method of claim 1, wherein the pollutant comprises ethylene dibromide.

22. An anaerobic bioremediation system comprising:

means for supplying an alkane to a contaminated site in the substantial absence of oxygen to stimulate the growth of anaerobic bacteria which degrade a pollutant at the contaminated site, wherein the means for supplying the alkane comprises a source of a butane substrate including at least about 10 weight percent butane.

23. The system of claim 22, further comprising means for subsequently supplying an oxygen-containing gas to the contaminated site to aerobically treat the contaminated site.

24. An in-situ anaerobic bioremediation system comprising:

a source of an alkane, wherein the alkane comprises a butane substrate including at least about 10 weight percent butane; and at least one injector in flow communication with the source of the alkane.

25. The system of claim 24, wherein the butane substrate comprises at least about 50 weight percent butane.

26. The system of claim 25, wherein the butane substrate comprises at least about 90 weight percent butane.

27. The system of claim 24, further comprising:

a source of an oxygen-containing gas; and at least one injector in flow communication with the source of the oxygen-containing gas.

* * * * *